June 19, 1923.
O. J. ERICSSON
1,459,584
LOCK MECHANISM
Filed March 11, 1922
2 Sheets-Sheet 1
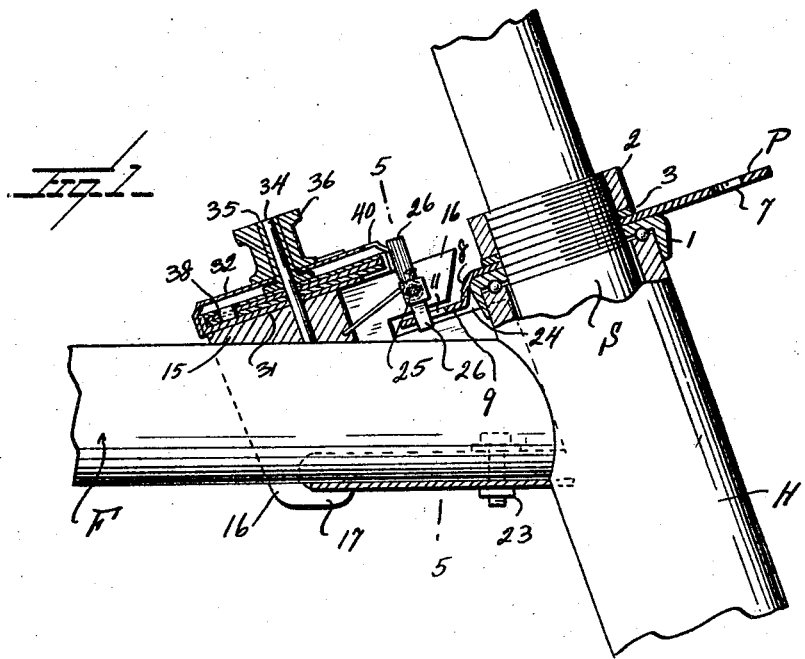
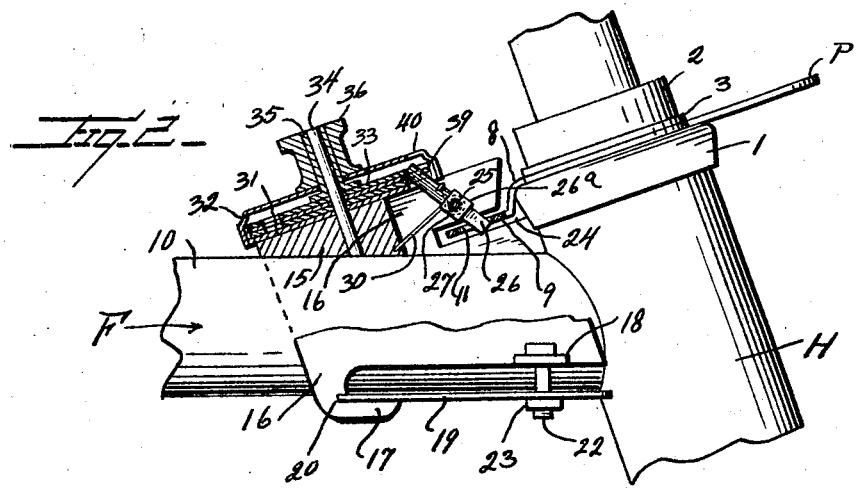
Inventor
O. J. Ericsson
By Watson E. Coleman
Attorney

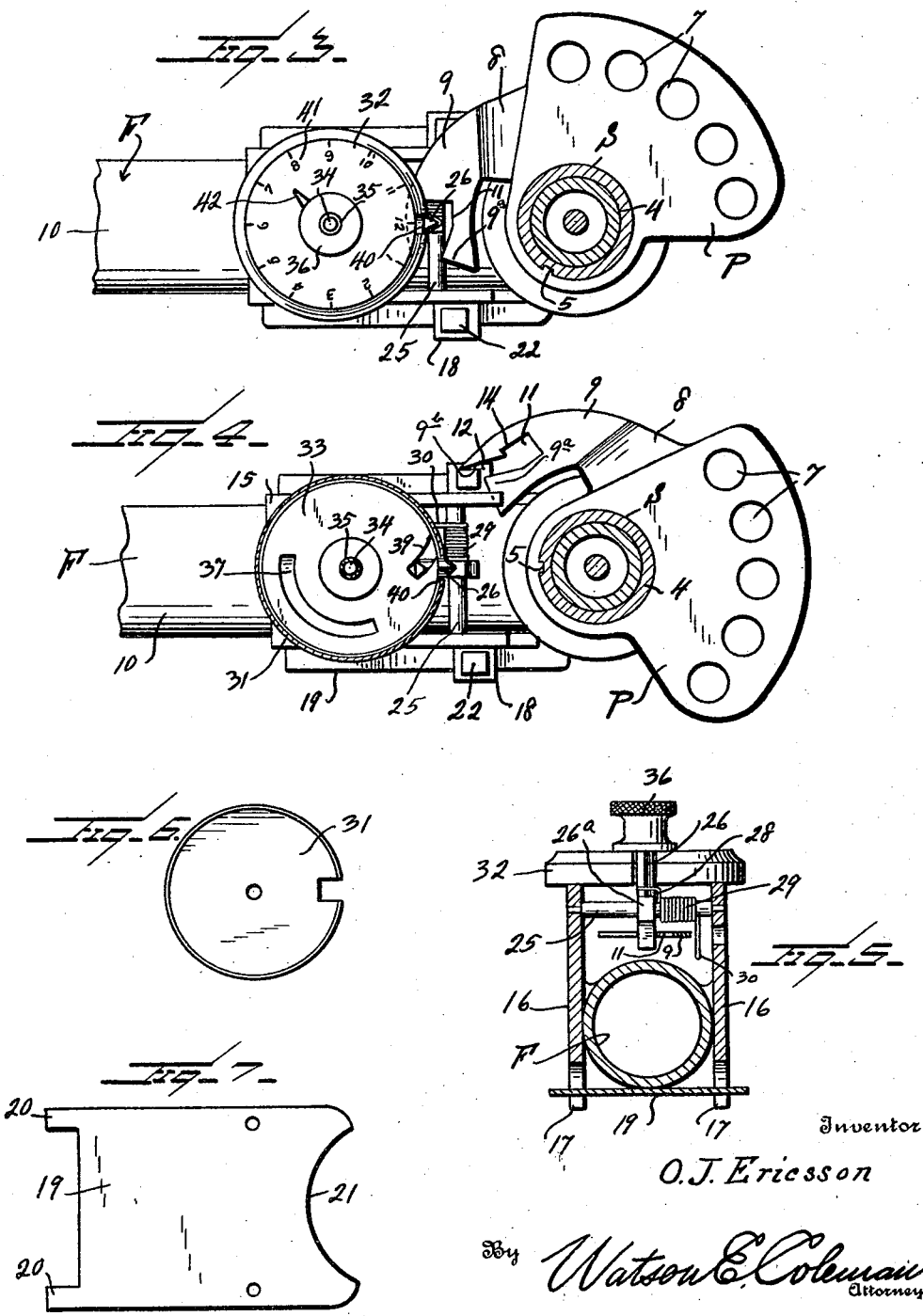

Patented June 19, 1923.

1,459,584

UNITED STATES PATENT OFFICE.

OTTO J. ERICSSON, OF WARREN, PENNSYLVANIA.

LOCK MECHANISM.

Application filed March 11, 1922. Serial No. 542,965.

*To all whom it may concern:*

Be it known that I, OTTO J. ERICSSON, a citizen of the United States, residing at Warren, in the county of Warren and State of Pennsylvania, have invented certain new and useful Improvements in Lock Mechanisms, of which the following is a specification, reference being had to the accompanying drawings.

This invention relates to certain improvements in lock mechanisms and has relation more particularly to a mechanism of this general character especially designed and adapted for use in connection with bicycles or kindred vehicles having a steering fork, and it is an object of the invention to provide a lock mechanism of a novel and improved construction which operates to lock said fork against turning movement after the same has been rotated or turned a required distance out of straight ahead position.

Another object of the invention is to provide a novel and improved mechanism of this general character comprising a latch member having movement with the fork, together with a bolt carried by the frame of the vehicle coacting with the latch to hold the fork against turning or rocking movement when said fork is in its predetermined position.

The invention consists in the details of construction and in the combination and arrangement of the several parts of my improved lock mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in section and partly in elevation illustrating a lock mechanism constructed in accordance with an embodiment of my invention and in applied position;

Figure 2 is a view similar to Figure 1 with certain of the parts in a second position;

Figure 3 is a view in top plan of the structure as illustrated in Figure 1;

Figure 4 is a fragmentary view partly in top plan and partly in section showing the arrangement of the mechanism when the fork is in substantially straight ahead position;

Figure 5 is a sectional view taken substantially on the line 5—5 of Figure 1;

Figure 6 is a view in plan of the casing for the permutation mechanism as herein employed; and Figure 7 is a view in plan of the bottom plate employed to hold a portion of the mechanism to the frame of the bicycle or kindred vehicle.

As disclosed in the accompanying drawings, H denotes the head of a frame F of a bicycle or kindred vehicle and through which is disposed in a conventional manner the shank S of a steering fork. Coacting with the upper end portion of the head H in a well known manner is a cap 1 above which is positioned a holding nut 2, together with an intervening washer 3.

P denotes a plate provided in one end portion with an opening 4 to snugly receive the upper portion of the shank S, said plate being herein disclosed as provided with a lug 5 extending inwardly of the opening 4 and which fits within a groove 6 extending longitudinally of the shank S so that the plate P is keyed to the shank S for turning movement therewith.

As herein disclosed, the plate P when applied extends forwardly of the shank S and is provided with the openings 7 through which are adapted to be inserted fork truss bars (not shown) when the plate P is employed in connection with a bicycle embodying such reinforced structure.

Extending downwardly and laterally from a side marginal portion of the plate P at a point in relatively close proximity to the opening 4 is a web or flange 8 continued by an inwardly disposed arcuate arm 9, said arm 9 being substantially to one side of the top bar 10 of the frame when the front or steering fork is in substantially straight ahead position. The free end portion of the arm 9 is provided with a recess or opening 11 having in communication therewith an obliquely disposed entrance slot 12, the outer wall of said slot 12 having its inner end terminating inwardly of the outer side wall of the opening 11 whereby a holding or retaining shoulder 14 is provided.

15 denotes a head or block which is mounted upon the top bar 10 at a point in relatively close proximity to the head H, the top face of said head or block 15, when the head or block is in applied position, extending outwardly and forwardly on a predetermined incline, as is clearly illustrated in Figures 1 and 2. The sides of the head or block 15 are provided with the depending flanges 16 which also extend forwardly of the head or block. The flanges 16 are positioned at opposite sides of the upper bar 10 and at their rear portions have the forwardly facing lugs 17. The forward portion of each of the flanges 16 is provided with an outstanding lug 18.

19 denotes a holding plate which underlies the top bar 10 of the frame F and has its rear portion resting upon the hook lugs 17, the side marginal portions of said plate 19 being provided with the inwardly and rearwardly directed extensions 20 which are arranged outwardly of the plates 16 to hold the lower portions of said plates against outward or separating movement. The forward margin of the plate 19 is provided with a cut out portion 21 to permit snug contact of said forward end portion of the plate 19 with the head H.

Disposed through each of the lugs 18 and a side marginal portion of the plate 19 is a headed shank or bolt 22 having threaded thereon a clamping nut 23. By proper adjustment of each of the nuts 23, the plate 19 operates effectively to maintain the block 15 in applied position. The forward portion of one of the flanges 16, preferably the flange at the left side of the block 15, is provided with an open slot 24 through which the arcuate arm 9 passes when the shank S of the steering fork is turned or rotated toward the left and out of straight ahead position.

Connecting the forward extended portions of the flanges 16 at a point above the slot 24 is a rod or bar 25 upon which is mounted a swinging or rocking bolt 26, said bolt extending above and below the rod or bar 25. An intermediate portion of the bolt 26 is enlarged, as at 26ª, and said enlarged portion is provided with a slot 27 through which the bar 25 is disposed and whereby the bolt 26 is capable of movement independently of the rod 25 to the extent permitted by the length of the slot 27.

The lower end portion of the bolt 26 is constantly urged forwardly and the upper end of said bolt constantly urged rearwardly through the instrumentality of a spring arm 28 bearing against the upper portion of said bolt 26. The arm 28 is herein disclosed as comprising an extremity of a coiled spring 29 encircling the rod 25 to one side of the bolt 26 and having its opposite end portion provided with an extended extremity or arm 30 suitably anchored or secured to the forward face of the block 15.

Secured to the upper or inclined face of the block 15 is a cup-shaped member 31 with which is engaged a top or closure member 32, said members 31 and 32 combining to provide a housing in which are rotatably mounted a plurality of discs 33. The discs 33 are mounted upon an upstanding pin 34 carried by the block 15 and about which each of the discs 33 is capable of having independent rotation. The top disc 33 is provided with an upstanding bushing or sleeve 35 which surrounds the pin 34 and extends exteriorly of the housing through the top member 31 and suitably secured to said sleeve or bushing 35 is an operating knob or handle 36.

Each of the discs 33 is provided in its peripheral portion with an arcuate slot 37, said slots being of varying lengths and the uppermost disc 33 having a depending lug or tongue 38 extending through the slots 37 in the discs 33 arranged therebelow. The peripheral portions of the discs 33 are provided with the open arcuate slots 39 which, upon proper manipulation of the upper disc 33, are brought into register one with the other and with an entrance slot 40 in the forward portion of the housing afforded by the members 31 and 32. In order to rotate the discs 33 to bring the slots 39 into desired register with each other and with the entrance slot 40, the outer face of the member 32 is provided with the indications 41 with which coacts a pointer or index 42 carried by the knob or head 36, said desired registry being accomplished by a known combination.

When the shank S is turned or rotated to one side, as to the left, the arm 9 will pass inwardly and across the upper portion of the bar 10 and the lower portion of the bolt 26 will contact with the portion 9ª of the end edge of the arm 9 in advance of the entrance slot 12. This will cause the lower portion of the bolt 26 to be forced inward or rearward and the upper portion of said bolt 26 outward and with such force that as the upper portion of the bolt 26 is moved outward through the entrance slot 40, said upper portion of the bolt 26 will engage the walls of the arcuate slots 37 of the discs 33 so that the discs 33 will be sufficiently rotated to move the slots 37 out of register with the slot 40 and whereby the unbroken peripheral edges of the assembled discs 33 will hold the bolt 26 for locking when the bolt 26 has passed over the portion or inner corner 9ª. The bolt 26, after passing over said portion or corner 9ª, is received within the slot 12 and rides along the wall 9ᵇ. It is by this action that the slot 27 causes the lower portion of the bolt 26 to be moved into contact with the shoulder 14. During this latter action, the upper portion of the bolt 26 is stationary.

It is to be understood that when the steering fork is in substantially a straight ahead position, the upper portion of the bolt 26 is positioned within the closed end portions of the registering slots 39.

From the foregoing description it is thought to be obvious that a lock mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. The combination with a frame of a bicycle and an associated steering fork, an arm operatively connected with the steering fork and extending laterally therefrom, said arm having a recess and an entrance slot in communication with said recess, a movable bolt, means for mounting said bolt upon the frame, said bolt being positioned to pass through the entrance slot into the recess upon turning movement of the fork in one direction, and means operated by the movement of the bolt during its entrance within the recess to hold the bolt against movement.

2. The combination with the frame of a bicycle and an associated steering fork, an arm operatively connected with the steering fork and extending laterally therefrom, said arm having a recess and an entrance slot in communication with said recess, a movable bolt, means for mounting said bolt upon the frame, said bolt being positioned to pass through the entrance slot into the recess upon turning movement of the fork in one direction, and means for holding the bolt against movement when within the recess, a wall of the recess to one side of the entrance slot forming a shoulder with which the bolt engages when positioned within the recess.

3. The combination with the frame of a bicycle and an associated steering fork, of an arm operatively engaged with the fork and extending laterally therefrom, said arm having a recess, an obliquely disposed entrance slot in communication with the recess, a bolt, means for supporting said bolt upon the frame for swinging movement, an extremity of the bolt passing through the entrance slot into the recess upon turning movement of the fork in one direction, a spring coacting with said bolt for constantly urging the same in one direction, and means for locking the bolt against movement in the opposite direction.

4. The combination with the frame of a bicycle and an associated steering fork, of an arm operatively engaged with the fork and extending laterally therefrom, said arm having a recess, an obliquely disposed entrance slot in communication with the recess, a bolt, means for supporting said bolt upon the frame for swinging movement, an extremity of the bolt passing through the entrance slot into the recess upon turning movement of the fork in one direction, a spring coacting with said bolt for constantly urging the same in one direction, and a plurality of superimposed discs carried by the frame, each of said discs being rotatable independently of the remainder, said discs being provided with slots adapted to register, the action of the spring maintaining the bolt within said slots when in register, relative turning movement of the discs bringing the slots thereof out of register to prevent the return of the bolt therein.

5. The combination with the frame of a bicycle and an associated steering fork, of an arm operatively engaged with the fork and extending laterally therefrom, said arm having a recess, an obliquely disposed entrance slot in communication with the recess, a bolt, means for supporting said bolt upon the frame for swinging movement, an extremity of the bolt passing through the entrance slot into the recess upon turning movement of the fork in one direction, a spring coacting with said bolt for constantly urging the same in one direction, and a plurality of superimposed discs carried by the frame, each of said discs being rotatable independently of the remainder, said discs being provided with slots adapted to register, the action of the spring maintaining the bolt within said slots when in register, relative turning movement of the discs bringing the slots thereof out of register to prevent the return of the bolt therein, said slots of the discs when in register being angular to the radii of the discs so that the bolt, as the same passes outwardly from said registering slots, operates to rotate the discs.

6. The combination with the frame of a bicycle and an associated steering fork, of an arm operatively engaged with the fork and extending laterally therefrom, said arm having a recess, an obliquely disposed entrance slot in communication with the recess, a bolt, means for supporting said bolt upon the frame for swinging movement, an extremity of the bolt passing through the entrance slot into the recess upon turning movement of the fork in one direction, a spring coacting with said bolt for constantly urging the same in one direction, and means for locking the bolt against movement in the opposite direction, the pivotal connection of the bolt being loose.

7. In combination with the frame of a bicycle and an associated steering fork, with an arm operatively engaged with the fork, said arm being provided with a recess, and an obliquely disposed entrance slot in communication with the recess, a bolt, means for supporting said bolt upon the frame for swinging movement, an extremity of the bolt passing through the entrance slot into the recess upon turning movement of the fork in one direction, means for constantly urging the bolt in one direction, and means for locking the bolt against such movement.

8. In combination with the frame of a bicycle and an associated steering fork, with an arm operatively engaged with the fork, said arm being provided with a recess, and an obliquely disposed entrance slot in communication with the recess, a bolt, means for supporting said bolt upon the frame for swinging movement, an extremity of the bolt passing through the entrance slot into the recess upon turning movement of the fork in one direction, means for constantly urging the bolt in one direction, and means carried by the frame for locking the bolt against such movement.

9. In combination with the frame of a bicycle and an associated steering fork, with an arm operatively engaged with the fork, said arm being provided with a recess, and an obliquely disposed entrance slot in communication with the recess, a bolt, means for supporting said bolt upon the frame for swinging movement, an extremity of the bolt passing through the entrance slot into the recess upon turning movement of the fork in one direction, means for constantly urging the bolt in one direction, and permutation means carried by the frame for locking the bolt against such movement.

In testimony whereof I hereunto affix my signature.

OTTO J. ERICSSON.